(12) United States Patent
Steinwandter et al.

(10) Patent No.: US 11,078,549 B2
(45) Date of Patent: Aug. 3, 2021

(54) REDUCTION GAS EXTRACTION FROM SATURATED TOP GAS

(71) Applicant: Primetals Technologies Austria GmbH, Linz (AT)

(72) Inventors: Andreas Steinwandter, Linz (AT); Robert Millner, Loosdorf (AT); Hanspeter Ofner, Pucking (AT)

(73) Assignee: PRIMETALS TECHNOLOGIES AUSTRIA GMBH, Linz (AT)

( * ) Notice: Subject to any disclaimer, the term of this patent is extended or adjusted under 35 U.S.C. 154(b) by 0 days.

(21) Appl. No.: 16/644,418

(22) PCT Filed: Aug. 23, 2018

(86) PCT No.: PCT/EP2018/072726
§ 371 (c)(1),
(2) Date: Mar. 4, 2020

(87) PCT Pub. No.: WO2019/048243
PCT Pub. Date: Mar. 14, 2019

(65) Prior Publication Data
US 2020/0216921 A1    Jul. 9, 2020

(30) Foreign Application Priority Data
Sep. 6, 2017   (EP) ..................... 17189556

(51) Int. Cl.
*C21B 13/00* (2006.01)

(52) U.S. Cl.
CPC ........ *C21B 13/0073* (2013.01); *C21B 13/004* (2013.01); *C21B 13/0033* (2013.01);
(Continued)

(58) Field of Classification Search
CPC ............ C21B 13/0073; C21B 13/0033; C21B 13/004; C21B 2100/64; C21B 2100/22;
(Continued)

(56) References Cited

U.S. PATENT DOCUMENTS 5,673,724 A * 10/1997 Abel ...................... E03C 1/04
                                                      137/359
5,958,107 A    9/1999 Greenwalt
(Continued)

FOREIGN PATENT DOCUMENTS

| RU | 2532202 C2 | 10/2014 |
| RU | 2014154385 A | 7/2016 |
| WO | 2013027084 A1 | 2/2013 |

OTHER PUBLICATIONS

European Search Report received in 17189556.8 dated Feb. 20, 2018, pp. 7.
(Continued)

*Primary Examiner* — John A Hevey
(74) *Attorney, Agent, or Firm* — Liang & Hennessey LLP; Brian Hennessey

(57) ABSTRACT

The invention relates to a method for reducing metal oxides to metallized material by means of contact with reduction gas, wherein an accumulated top gas is dry dedusted and reformed in a raw gas mixture together with gaseous hydrocarbons. The water vapor content of the dry dedusted top gas designated for the preparation of the raw gas mixture is adjusted in a saturator in the countercurrent by means of saturation water, wherein the temperature of the saturation water is adjusted, by mixing cold water with a hot water having a higher temperature than the cold water, in order to produce the saturation water at a target value. The invention further relates to a device for carrying out such a method, having corresponding conduits.

18 Claims, 8 Drawing Sheets

(52) U.S. Cl.
CPC ...... *C21B 2100/22* (2017.05); *C21B 2100/42* (2017.05); *C21B 2100/44* (2017.05); *C21B 2100/64* (2017.05)

(58) Field of Classification Search
CPC ............. C21B 2100/42; C21B 2100/44; Y02P 10/134
See application file for complete search history.

(56) References Cited

U.S. PATENT DOCUMENTS

| | | | | |
|---|---|---|---|---|
| 7,788,930 | B2* | 9/2010 | Aiton | F01K 21/047 60/775 |
| 8,097,172 | B2* | 1/2012 | Islam | C02F 1/10 210/774 |
| 2011/0284800 | A1* | 11/2011 | Millner | C21B 13/143 252/373 |
| 2012/0174710 | A1* | 7/2012 | Millner | C22B 5/12 75/392 |

OTHER PUBLICATIONS

International Preliminary Report on Patentability received in PCT/EP2018/072726 dated Aug. 1, 2019, pp. 16.
International Search Report and Written Opinion received in PCT/EP2018/072726 dated Oct. 9, 2018, pp. 13.

* cited by examiner

REDUCTION GAS EXTRACTION FROM SATURATED TOP GAS

CROSS-REFERENCE TO RELATED APPLICATIONS

The present application is a national phase application of PCT Application No. PCT/EP2018/072726, filed Aug. 23, 2018, entitled "REDUCTION GAS EXTRACTION FROM SATURATED TOP GAS", which claims the benefit of European Patent Application No. 17189556.8, filed Sep. 6, 2017, each of which is incorporated by reference in its entirety.

BACKGROUND OF THE INVENTION

1. Field of the Invention

The application relates to a process for reduction of metal oxides to metallized material by contact with hot reduction gas, giving a dry-dedusted top gas which is catalytically reformed together with gaseous hydrocarbons for production of the reduction gas.

2. Description of the Related Art

Processes for direct reduction of iron oxide supports by means of a reduction gas produced by reforming natural gas are known, for example the MIDREX® process as described in WO2011/012448 and WO2011/012452.

One reaction that proceeds in the reformer is

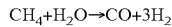
$$CH_4 + H_2O \rightarrow CO + 3H_2$$

Correspondingly, the water vapor content of the crude gas mixture to be reformed is a crucial factor.

A further reaction that proceeds in the reformer is:

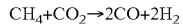
$$CH_4 + CO_2 \rightarrow 2CO + 2H_2$$

$CO_2$, for example, is introduced into the crude gas mixture to be reformed by, in the direct reduction, mixing natural gas into top gas removed from the reduction shaft after processing.

The top gas removed from the reduction shaft is very dust-laden. Therefore, dedusting is necessary, firstly for avoidance of dust-related wear on apparatuses such as compressors and conduits needed for recycling of the top gas—as a constituent of the crude gas mixture for the reformer and subsequently as a constituent of the reduction gas for the reduction shaft, for avoidance of dust-related wear in the reformer, and secondly for avoidance of accumulations of the dust, and for avoidance of hindrance of reforming in the reformer.

The use of wet dedusting—for example by means of Venturi scrubbers—and of dry dedusting is known.

A disadvantage in wet dedusting is that large amounts of process water under high pressure are required, which are in direct contact with the process gases. The dust separated out of the gas is obtained as wet sludge in a classifier or a thickener and has to be subjected to complex further processing.

A disadvantage in dry dedusting is that the temperature of the top gas in the dedusting step itself is virtually not reduced, and the water vapor content of the top gas is correspondingly not reduced by condensation. Accordingly, a top gas dedusted in such a way has a water vapor content which is unfavorably high for later reforming and variable. Cooling that follows the dry dedusting is therefore necessary in order to condense a proportion of the water vapor and keep it at a controlled value.

SUMMARY OF THE INVENTION

It is an object of the present application to provide a process which permits simple adjustment of the water vapor content in dry dedusting with a low level of complexity and with the ability to react rapidly to various demands of the process regime. An apparatus capable of achieving these aims is likewise to be provided.

This object is achieved by a process for reducing metal oxides to metallized material by contact with hot reduction gas, giving a top gas, wherein dry dedusting of the top gas takes place, and wherein the reduction gas is at least partly obtained by catalytic reforming of a crude gas mixture, wherein the crude gas mixture is prepared at least on the basis of:
gaseous hydrocarbons, preferably natural gas, and
at least a proportion of the dry-dedusted top gas, characterized in that:
the water vapor content of the dry-dedusted top gas intended for the preparation of the crude gas mixture is adjusted either solely in a saturator in countercurrent with saturation water or also in a saturator in countercurrent with saturation water, wherein the temperature of the saturation water, by mixing cold water with a hot water having a higher temperature than the cold water, is adjusted to a target value for production of the saturation water.

The adjustment of the water vapor content or the adjustment of the target value for the temperature of the saturation water may be an open-loop or closed-loop control method.

The target value for the temperature of the saturation water may be a particular temperature or a temperature range, called a target temperature range. The adjustment of the water vapor content may likewise have a particular water vapor content as its target, or a range of values, called a target water vapor range.

Cold water refers to water intended for introduction into the saturator that has a lower temperature than the hot water.

Hot water has a higher temperature than the cold water. It may be a hot process water—in the sense that it has a higher temperature than the cold water—that is obtained elsewhere in the process for reducing metal oxides, for example water which is used for cooling of hot gases within the reduction process, such as for the cooling of seal gas in the seal gas cooler or a proportion of the reformed gas in a gas cooler, and the hot water return streams of which—frequently also called pure process water—are collected in a water tank; saturator wastewater may also be introduced into this water tank.

It is possible to send an amount of water from this water tank with combined hot water return streams to cooling—for example in heat exchangers—and to use it as cold water after the cooling.

In the saturator, the water vapor content of the dry-dedusted top gas is adjusted in countercurrent with saturation water.

The saturator is, for example, a packed column through which the saturation water flows in countercurrent to the dry-dedusted top gas. Such a packed column typically has a water distributor above the packing to be wetted, the latter consisting of random packings or a structured packing or the like, in order to assure good heat and mass transfer. Above the water distributor or at the exit from the packed column is typically installed a droplet separator—demister—in order to prevent the entrainment of droplets with the gas stream.

Metal oxides are preferably understood to mean iron oxides or iron oxide-containing feedstocks. Moreover, it is alternatively possible to reduce, according to the Richardson-Jeffes diagram, for example, oxidic ores of nickel, copper, lead, and cobalt.

The reduction is preferably a direct reduction.

The metallized material is preferably the product of the direct reduction.

The metal oxides are preferably reduced to largely metallized metal—meaning that there is a degree of metallization of, for example, typically not less than 90%, preferably not less than 92%—for example iron sponge, also called DRI (direct reduced iron). The degree of metallization is the ratio between metallic iron and total iron.

The product of the direct reduction of iron oxide-containing feedstocks, for example DRI or HDRI, is preferably hot-briquetted, for example processed to give hot briquetted iron HBI. It may alternatively be discharged in the hot state from the reduction shaft in which the direct reduction takes place and utilized directly in the steelworks—for example by addition in the hot state to an electrical arc furnace.

The dry dedusting is effected, for example, by means of fabric filters, for example cloth or bag filters. For coarse dedusting upstream of the fabric filters, it is also possible to provide coarse dedusting based, for example, on a cyclone or dust bag.

It is possible to subject the entire top gas to dry dedusting, or a proportion of the top gas.

The reduction gas may be obtained entirely by catalytic reforming of a crude gas mixture; it may alternatively contain constituents that do not come from the catalytic reforming of the crude gas mixture.

The crude gas mixture is prepared at least on the basis of gaseous hydrocarbons and of at least a proportion of the dry-dedusted top gas.

The wording "based on gaseous hydrocarbons, preferably natural gas" includes both a single gaseous hydrocarbon and gas mixtures containing one or more gaseous hydrocarbons. An example of such a gas mixture is natural gas.

It is possible to use the entire dry-dedusted top gas in order to prepare the crude gas mixture; it is alternatively possible to use just a proportion of the dry-dedusted top gas for the purpose.

The water vapor content of the dry-dedusted top gas intended for the preparation of the crude gas mixture is adjusted in a saturator in countercurrent with saturation water.

In the process regime of the invention, after the dry dedusting, the water vapor content of the top gas intended for the preparation of the crude gas mixture is adjusted to a desired value or a desired range of values. According to the invention, one process step that takes place for the purpose is adjustment of the temperature of the saturation water to a target value by mixing cold water with a hot water for production of the saturation water. In general, dry-dedusted top gas has a water vapor content of about 20% to 30% by volume. In the case of cooling by water injection prior to the dry dedusting, the water vapor content may also rise to above 30% by volume, for example 32% by volume.

The aim is to establish a favorable water vapor content for later reforming.

The target value for the temperature of the saturation water is chosen so as to result in a water vapor content in the top gas that is favorable for the later reforming after the interaction with the dry-dedusted top gas.

The water vapor content of the dry-dedusted top gas intended for the preparation of the crude gas mixture is adjusted in a saturator in countercurrent with saturation water.

The water vapor content of the dry-dedusted top gas intended for preparation of the crude gas mixture is either adjusted solely in a saturator in countercurrent with saturation water or—in addition to further measures—it is also adjusted in a saturator in countercurrent with saturation water. For adjustment of the water vapor content, it is thus additionally also possible to implement further measures such as the addition of steam or the injection of liquid water—for example by means of one-phase or two-phase nozzles. For example, such additional measures may be helpful in the startup of the plant. They may also be helpful in order to achieve fine control or faster control—by comparison to the saturator—of the water vapor content. This could be desirable, for example, to remedy or avoid problems in reformer operation, for example for avoidance of carbon deposits in the reformer catalyst. At least 70% of the water vapor content is to be contributed by saturator.

For adjustment of the temperature of the saturation water, it is additionally also possible to implement further measures such as cooling or heating.

Owing to the influence of the invention on the water vapor content, it is possible to reduce the risk of carbon deposits on the catalyst in the reformer, which increases the lifetime and availability thereof. The effect is particularly favorable on the startup of a plant.

By comparison with a conventional process regime, for example with wet dedusting, what is advantageous about the process regime of the invention is that higher hydrogen $H_2$ to carbon monoxide CO ratios $H_2/CO$ can be established in the reduction gas. The water vapor content in the reforming determines the ratio of CO and $H_2$ in the reduction gas; the adjustment of the water vapor content in the dedusted top gas—optionally within a wider range by comparison to a conventional process regime—can thus affect the progression of the reduction. Hydrogen reduction is quicker and predominantly endothermic; carbon monoxide reduction is slower than hydrogen reduction and predominantly exothermic. Flexible adjustability facilitates an economic process regime. In the case of rapid attainment of higher temperature of the saturation water and hence a higher temperature of the dry-dedusted top gas exiting from the saturator, it is rapidly possible to achieve a particular, sufficiently high water vapor content.

Existing plants with wet dedusting can be retrofitted in a simple manner for dry dedusting and hence prepared for the performance of the process. The replacement of Venturi scrubbers by dry filters entails only relatively low capital costs. Another advantage by comparison with operation with wet dedusting is that wastewaters with a high solids content that comes from elsewhere in the process for reducing metal oxides—for example from the dedusting of gases from the hot briquetting, from the dedusting of gases from heated transport devices, from the dedusting of barrier gases from reduction reactors—are not diluted by common workup with wastewater bearing a comparatively low level of solids. This simplifies the workup of such wastewaters.

Compared to wet dedusting, dry dedusting offers the advantage that dust, by contrast with sludge, need not be dried in a complex manner prior to further use.

Compared to wet dedusting, dry dedusting offers the advantage that a lower pressure drop occurs, and accordingly less power and power consumption is needed for downstream compressors in order to achieve desired pressures.

In a preferred embodiment, cold water and hot water are mixed under closed-loop control based on:
measurement of the saturation water temperature, and/or
measurement of the saturated top gas temperature, and
a target value set for the temperature and/or the water vapor content of the saturated top gas and/or a target value set for the temperature of the saturation water.

The dry-dedusted top gas exiting from the saturator is called saturated top gas.

The temperature of the saturation water is under closed-loop control in such a way that the temperature and/or the water vapor content of the saturated top gas correspond(s) to a target value or a target range. The temperature also defines the water vapor content for thermodynamic reasons.

In a preferred embodiment, the target value is 323-373 K, preferably 338-363 K, in each case including the two limits. On operation of the process at a pressure of 1 $bar_g$, there is a possible water vapor content of 6-51% by volume; in the case of operation at 2 $bar_g$, there is a possible water vapor content of 4-34% by volume. Desired values are water vapor content 10-20% by volume.

In an advantageous embodiment, at least some of the hot water having a higher temperature than the cold water is saturator wastewater removed from the saturator.

Since the top gas is subjected to dry dedusting beforehand, the saturator wastewater is usable for such a utilization. Without dry dedusting beforehand, the dust burden entrained as sludge would complicate or prevent utilization as saturator wastewater.

In a preferred variant, the proportion of the saturator wastewater utilized as hot water is sent to utilization as hot water directly after leaving the saturator. It is thus not introduced into a water tank prior to utilization as hot water, and possibly combined therein with other hot water return streams from elsewhere in the process for reduction of metal oxides before being sent to the saturator for utilization as hot water—possibly as a mixture with the other hot water return streams. Instead, the saturator wastewater is sent to utilization as hot water directly after leaving the saturator.

In another variant, the proportion of the saturator wastewater utilized as hot water is introduced into a water tank—where it is possibly combined with other hot water return streams from elsewhere in the process for reduction of metal oxides, before being sent to the saturator for utilization as hot water—possibly as a mixture with the other hot water return streams.

In the saturator, the water vapor content of the dry-dedusted top gas is adjusted in countercurrent with saturation water. After the interaction in countercurrent, what is called the saturator wastewater is removed from the countercurrent region in which the interaction takes place. Owing to the higher gas inlet temperature into the saturator and the condensation that takes place therein, the saturator wastewater has a higher temperature than the saturation water on entry into the saturator.

The saturator wastewater leaves the saturator under pressure—hydrostatic pressure plus gas pressure of the dedusted top gas introduced. Therefore, saturator wastewater removed from the saturator that is under this pressure can simply be mixed with cold water. The mixing is also simplified in that it can take place in the immediate proximity of the saturator—without having to overcome any great differences in height and hence hydrostatic pressures.

Accordingly, pumps that recirculate saturator wastewater into the saturator via mixing with cold water need not be designed to overcome great differences in height and/or pressure drops; they may be smaller and hence consume less power.

These advantages arise especially when the saturator wastewater is sent to utilization as hot water directly after leaving the saturator. If hot water from a water tank under atmospheric pressure which is arranged lower than the saturator is mixed into the cold water to establish a higher temperature, the pumps must be able to overcome the pressure difference for the purpose of supplying the mixture of cold water and hot water to the saturator, or of supplying the hot water from the water tank to cold water in the vicinity of the saturator.

The process regime of the invention has a particularly favorable effect on startup of a plant since a rapid increase in the temperature of the saturation water is possible when a comparatively large amount of saturator wastewater as hot water is mixed into the cold water to increase the temperature. This saves expenditure, for example, in increasing the temperature of cold water compared to a variant in which hot water from another origin is taken from a water tank, and specifically in the startup of a plant it is the case that a certain time would be required to bring the water in the water tank to the desired temperature. In the case of rapid attainment of higher temperature of the saturation water and hence a higher temperature of the dry-dedusted top gas exiting from the saturator, it is rapidly possible to achieve a particular, sufficiently high water vapor content.

Owing to condensation of water vapor in the saturator, the amount of saturator wastewater generally exceeds the amount of saturation water supplied; moreover, the saturation water is also formed using an amount of cold water. Therefore, in general, not all the saturator wastewater is mixed with cold water in order to produce saturation water; only a proportion is mixed with the cold water for the purpose of producing the saturation water. Saturator wastewater not mixed directly with the cold water can be guided into a tank for clean process water or pure process water since, owing to the prior dry dedusting of the top gas in the interaction in countercurrent in the saturator, there is virtually no contamination of the saturation water. Cooling may be appropriate here prior to introduction into the tank, since the saturator wastewater may be under an elevated pressure and temperature, such that elevated evaporation could occur owing to expansion on introduction into the tank. The proper disposal or cleaning of contaminated saturator wastewater would have been significantly more complex; in the case of introduction into existing disposal or cleaning systems for process wastewaters obtained in other ways, these would have to be designed in a larger size.

After cooling of the saturator wastewater, it can be reused as cold water; in the case of such a circulation regime, diffuse CO emissions from the process for reducing metal oxides are reduced.

The process regime of the invention thus offers the advantage that hot water required for adjusting the temperature of the saturation water need not be generated and/or procured in a complex manner, but is obtained in the saturator itself—as saturator wastewater—and can be utilized without any great complexity, possibly in direct proximity to the saturator, for the mixing.

The smaller the amount of saturator wastewater which is guided to the tank, the smaller the amount of gas constituents dissolved therein as well. These smaller amounts of water can simply be largely freed of constituents dissolved therein in degassing apparatuses and disposed of safely.

In the case of retrofitting of existing plants with wet dedusting to dry dedusting, it is possible to reuse any recirculation pumps present in the Venturi scrubber for the supply of the saturator wastewater to the cold water since they will also be suitable for this task if no great hydrostatic pressures need to be overcome.

In an advantageous embodiment, the top gas is desulfurized during and/or after the dry dedusting. For example, prior to the dry dedusting, it is possible to introduce a solid adsorbent into the stream of the top gas, on which hydrogen sulfide $H_2S$ is adsorbed; separation from the stream of the top gas is then effected in the dry dedusting. For example, after the dry dedusting, desulfurization on the basis of zinc oxide ZnO can be effected, which, for efficient performance, requires temperatures of 473-723 K, preferably 623-723 K. The top gas generally has a temperature of 623-673 K.

Desulfurization after the dry dedusting can also be effected by means of a wet process with a desulfurization liquid—for example water containing reagents for desulfurization—for example according to a reaction sequence

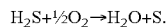

$H_2S+\frac{1}{2}O_2 \rightarrow H_2O+S.$

It is possible here as a first step, for example, to absorb hydrogen sulfide $H_2S$ in water $H_2O$.

Desulfurization by means of a wet process can be effected, for example, in a wet desulfurization aggregate prior to entry into the saturator. The wet desulfurization aggregate may be designed separately from the saturator. The wet desulfurization aggregate may also be present together with the saturator in a common wet desulfurization-saturation aggregate, wherein the gas passes first through the wet desulfurization and then through the saturator.

Desulfurization by means of a wet process can also be effected in the saturator by injecting appropriate desulfurization liquid; for example, a proportion or the entirety of the saturation water may also contain reagents for desulfurization.

In one embodiment, saturator wastewater may be utilized at least as a proportion of the desulfurization liquid.

In an advantageous embodiment, prior to the dry dedusting, the temperature of the top gas is reduced; for example to temperatures in the range of 423-533 K, in order to avoid damage to dry dedusting apparatuses, for example cloth or bag filters. In order to be able to conduct desulfurization based on ZnO even more efficiently thereafter, a temperature after the dry dedusting of 473-533 K is preferred.

In an advantageous embodiment, the temperature of the top gas prior to the dry dedusting is reduced by indirect heat exchange in a heat recovery plant. It is possible here to utilize heat withdrawn, for example, for steam raising, or for preheating of natural gas, or for preheating of fuel gas for the reformer, or for preheating of gas to be reformed prior to introduction into the reformer.

In an advantageous embodiment, the temperature of the top gas is reduced prior to the dry dedusting by injection of water or a combination of indirect heat exchange and injection of water. This is less complex in apparatus terms, and elevated water vapor content is unproblematic with regard to the saturator that follows downstream.

In an advantageous embodiment, the temperature of the top gas is reduced prior to the dry dedusting by introducing cooling gas. The gas that acts as cooling gas and has a lower temperature than the top gas may, for example, be saturated top gas—i.e. withdrawn downstream of the saturator.

In apparatus terms, it is also possible to take precautions with regard to the implementability of multiple embodiments for reduction of the temperature of the top gas prior to the dry dedusting; for example by means of a bypass starting between a water injection apparatus and a heat recovery plant, by means of which the heat recovery plant can be bypassed by the stream of the top gas. This makes it possible still to cool the gas that bypasses the heat recovery plant sufficiently with a water injection apparatus.

In an advantageous embodiment, a proportion of the dry-dedusted top gas, optionally after desulfurization, is supplied as a fuel gas component to a reformer for the catalytic reforming. Owing to the prior dedusting or desulfurization, the product of the combustion in the reformer—the reformer offgas—will emit little dust and little $SO_x$ into the environment. Higher temperature of the dedusted top gas compared to a wet dedusting contributes to more energetically favorable combustion in the reformer; in addition, the top gas, owing to the higher temperature, contains more water vapor for improving the heat transfer by radiation. Optionally, at least a proportion of this fuel gas component is cooled. Cooled fuel gas component obtained in this way can be utilized for introduction of cooling gas for reduction of the temperature of the top gas. Specifically in the case of utilization of a saturator, it is advantageous to subject wastewater from a cooler for the fuel gas component to further treatment together with the saturator wastewater.

According to the invention, the water vapor content of the dry-dedusted top gas intended for the preparation of the crude gas mixture is adjusted in a saturator in countercurrent with saturation water. This can be effected by sending the entire dry-dedusted top gas intended for the preparation of the crude gas mixture, in order to adjust its water vapor content, to a saturator—multiple saturators connected in parallel and/or in series are also possible. Alternatively, it is possible not to subject a portion of the dry-dedusted top gas intended for the preparation of the crude gas mixture to any adjustment of the water vapor content in a saturator, but to guide it past the saturator—or the saturators—in a bypass, by subjecting the remainder of the dry-dedusted top gas intended for the preparation of the crude gas mixture—i.e. dry-dedusted top gas intended for the preparation of the crude gas mixture minus a portion—to adjustment of the water vapor content, and subsequently combining the portion and the remainder. The overall result after the combination is thus, in respect of the dry-dedusted top gas intended for the preparation of the crude gas mixture, a water vapor content corresponding to the values of remainder and portion. Owing to the adjustment of the water vapor content of the remainder in the saturator, the water vapor content desired after the combination of remainder and portion is also established in the saturator. What is advantageous here is that the remainder in which the water vapor content has been adjusted—wherein a temperature drop occurred—together with the hotter portion—in which no temperature drop occurred as a result of adjustment of the water vapor content—raises the temperature of the mixture obtained in the combination by comparison with the temperature of the remainder. This is advantageous for assurance of exceedance of the dew point prior to feeding of the gas stream composed of dry-dedusted saturated top gas into downstream compressors. Such feeding is necessary for an increase in pressure in respect of the reforming and reduction that follow later in a reduction aggregate—for example a reduction shaft. By comparison with recycling of a proportion of dry-dedusted saturated top gas heated by compression into the gas stream sent to the compression for the purpose of increasing the temperature in this gas stream composed of the dry-dedusted saturated proportion, the solution of the invention with a bypass is more energy-saving since a comparatively smaller amount of energy has to be expended for the bypass compared to that for recycling of hot gas after compression.

The present application further provides an apparatus for reduction of metal oxides to metallized material by contact with hot reduction gas in a reduction aggregate,
comprising a reformer for catalytic reforming of a crude gas mixture, which is fed by a crude gas supply conduit,
comprising a reduction gas supply conduit that starts from the reformer and opens into the reduction aggregate,
comprising a top gas removal conduit that starts from the reduction aggregate and opens into a dry dedusting apparatus,
comprising a hydrocarbon supply conduit that opens into the crude gas supply conduit, characterized in that:
a saturator for adjusting the water vapor content of the dry-dedusted top gas is present, from which a saturated gas conduit for guiding of saturated top gas starts and opens into the crude gas supply conduit,
and a dedusting conduit starting from the dry dedusting apparatus for guiding of dry-dedusted top gas has an opening into the saturator,
and a saturation water supply conduit for supplying saturation water opens into the saturator,
and a cold water supply conduit for supplying cold water opens into the saturation water supply conduit,
and a hot water supply conduit for supplying hot water opens into the saturation water supply conduit,
and an adjustment apparatus for adjusting the temperature of the saturation water by mixing hot water with cold water is present.

The reduction aggregate may, for example, be a fixed bed reactor or a fluidized bed reactor.

The dry dedusting apparatus is based, for example, on fabric filters, for example cloth or bag filters.

The saturator is, for example, a packed column through which the saturation water flows in countercurrent to the dry-dedusted top gas.

The saturated gas conduit starting from the saturator guides dry-dedusted top gas exiting from the saturator, which is also called saturated top gas. It opens into the crude gas supply conduit.

The adjustment apparatus may be an open-loop control apparatus or a closed-loop control apparatus.

An apparatus of the invention is suitable for performing a process of the invention.

In an advantageous embodiment, the adjustment apparatus is a closed-loop control apparatus comprising:
at least one temperature sensor for measuring the temperature of the saturation water and/or
at least one temperature sensor for measuring the temperature of the saturated top gas.

A saturator wastewater conduit starts from the saturator. The saturator wastewater conduit serves to remove saturator wastewater from the saturator. In an advantageous embodiment, the saturator wastewater conduit opens into the hot water supply conduit, or a recycle conduit that opens into the hot water supply conduit branches off from the saturator wastewater conduit. Preferably, the branch and the opening are only at a small difference in height, in order to reduce the expenditure involved in overcoming pressure differences that occur owing to differences in height.

In an advantageous embodiment, a desulfurization apparatus is present in the top gas removal conduit. It may, for example, be an apparatus for addition of solid adsorbent to the stream of the top gas.

In an advantageous embodiment, a desulfurization apparatus is present in the dedusting conduit. It may, for example, be an apparatus that contains zinc oxide ZnO in one or more vessels arranged in parallel and in which the dedusted gas is largely freed of $H_2S$ while flowing through and in contact with ZnO.

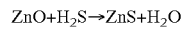

$$ZnO + H_2S \rightarrow ZnS + H_2O$$

The sulfur-laden zinc material is then exchanged again from time to time.

In an advantageous embodiment, at least one member from the group consisting of the following members is present in the top gas removal conduit:
heat recovery plant, preferably with an indirect heat exchanger,
water injection apparatus,
opening of a cooling gas inlet.

In an advantageous embodiment, a fuel gas component conduit is present, which starts from the dedusting conduit and opens into a fuel gas supply conduit for supply of fuel gas to the reformer.

In an advantageous embodiment, a gas cooling apparatus is present in the fuel gas component conduit, or any secondary branch present in the fuel gas component conduit.

BRIEF DESCRIPTION OF THE DRAWINGS

The schematic illustrative figures that follow illustrate the present invention with reference to illustrative embodiments shown in schematic form.

DETAILED DESCRIPTION

Figure 1:
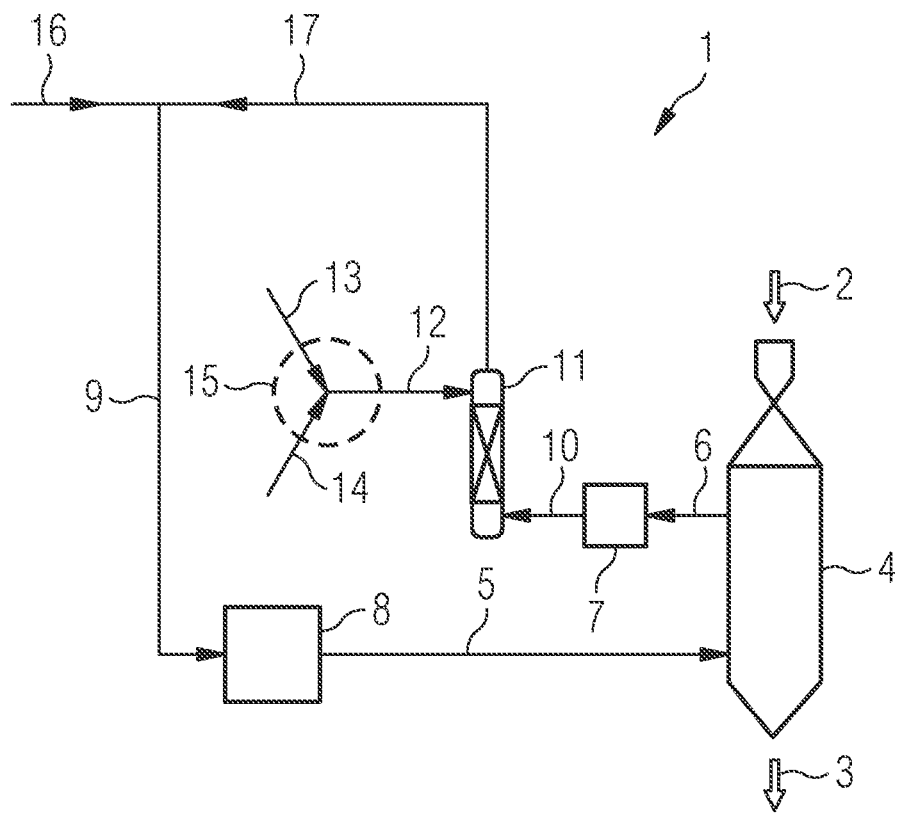
FIG. 1 shows an overall view of an apparatus of the invention.

FIG. 1 shows, in schematic form, by way of example, an inventive apparatus 1 for reduction of metal oxides 2 to metallized material 3 in a reduction aggregate 4. Metal oxides 2 are introduced into the reduction aggregate 4 at the top, a fixed bed reactor here. They pass through the reduction shaft of the fixed bed reactor under gravity, and they are reduced by contact in countercurrent with hot reduction gas introduced via the reduction gas supply conduit 5. The metallized material 3—for example iron sponge—is removed from the reduction aggregate at the bottom—specific discharge apparatuses are not shown specifically for better clarity. The spent reduction gas is removed as what is called top gas from the reduction aggregate 4 at the top via a top gas removal conduit 6 and guided into a dry dedusting apparatus 7. The reduction gas is prepared in a reformer 8 by catalytic reforming of a crude gas mixture based at least on gaseous hydrocarbons—natural gas in the case of this example—and on dry-dedusted top gas. The crude gas mixture is fed to the reformer via the crude gas supply conduit 9. The reduction gas supply conduit 5 that starts from the reformer 8 supplies the reduction gas prepared in the reformer 8 to the reduction aggregate 4.

A dedusting conduit 10 starts from the dry dedusting apparatus 7, through which dry-dedusted top gas intended for the preparation of the crude gas mixture is guided into the saturator 11—a packed column here. The water vapor content of the dry-dedusted top gas is adjusted in the saturator 11 by virtue of it passing through in countercurrent with saturation water with exchange of mass and heat. The saturator 11 is supplied with the saturation water via the saturation water supply conduit 12. A cold water supply conduit 13 for supplying cold water to the saturation water supply conduit 12 and a hot water supply conduit 14 for supplying hot water to the saturation water supply conduit 12 open into the saturation water supply conduit 12. An adjustment apparatus 15 for adjusting the temperature of the saturation water by mixing hot water with cold water is present. The hot water has a higher temperature than the cold water; the temperature of the saturation water is adjusted to a target value by mixing hot water and cold water.

In the example shown, the crude gas mixture is obtained by combining natural gas from a hydrocarbon supply conduit 16 and dry-dedusted top gas that has passed through the saturator 11—i.e. saturated top gas—from a saturated gas conduit 17.

The adjustment apparatus may be a closed-loop control apparatus comprising a temperature sensor for measurement of the temperature of the saturation water and/or a temperature sensor for measurement of the temperature of the saturated top gas. This is not shown specifically for better clarity. In this case, the mixing of cold water and hot water would be subjected to a closed-loop control method based on:

measurement of the saturation water temperature, and/or
measurement of the saturated top gas temperature, and
a target value set for the temperature and/or the water vapor content of the saturated top gas and/or a target value set for the temperature of the saturation water.

Figure 2:
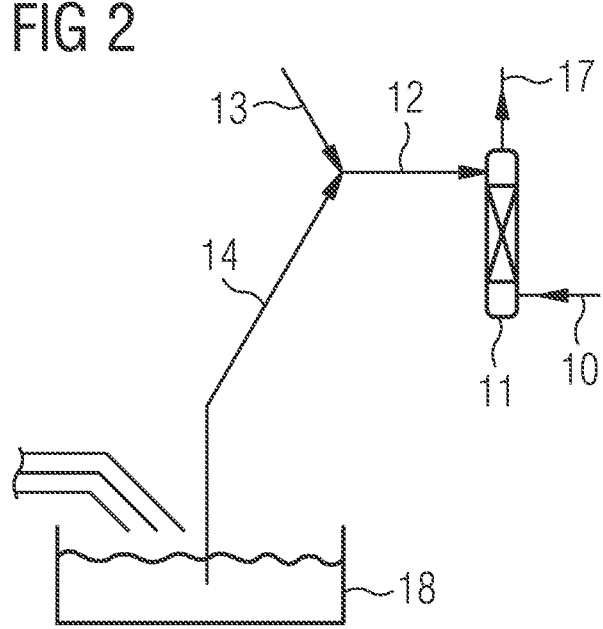
FIGS. 2 to 6 show embodiments of partial regions of an apparatus of the invention.

For the partial region from FIG. 1 around the saturator 11, FIG. 2 shows, with more details, the principle of taking hot water from a water tank 18. The water tank 18 may be filled, for example, by introducing hot water return streams from elsewhere in the process for reducing metal oxides, indicated by 3 conduit openings on the left-hand edge of the water tank.

Figure 3:
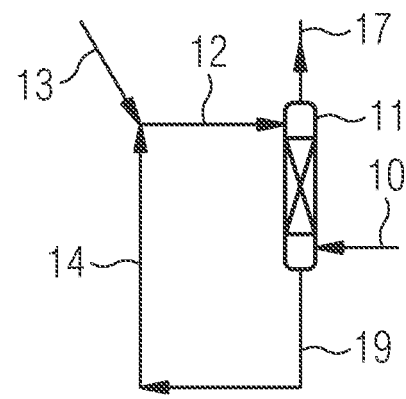

For the partial region from FIG. 1 around the saturator 11, FIG. 3 shows, with more details, how the hot water from the saturator is removed saturator wastewater. FIG. 3 shows a saturator wastewater conduit 19 starting from the saturator 11, which in turn opens into the into the hot water supply conduit 14. The saturator wastewater conduit 19 serves to remove saturator wastewater from the saturator 11. The saturator wastewater is not, as shown in schematic form in FIG. 5, wholly introduced into a water tank before it is sent to the saturator as a mixture with the other hot water return streams for utilization as hot water. Instead, the saturator wastewater is sent directly to utilization as hot water after leaving the saturator. A substream resulting from condensation of water from the top gas and cold water supply is removed to a water tank, but this is not shown specifically in FIG. 3.

Figure 4:
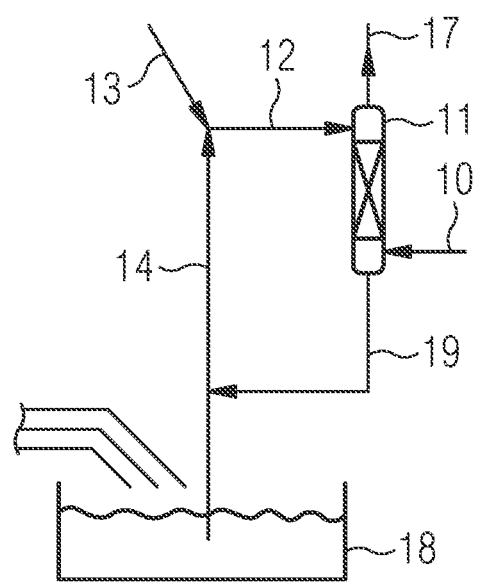

FIG. 4 more clearly shows an embodiment in which the hot water variants from FIGS. 2 and 3 are shown in combined simultaneous form.

Figure 5:
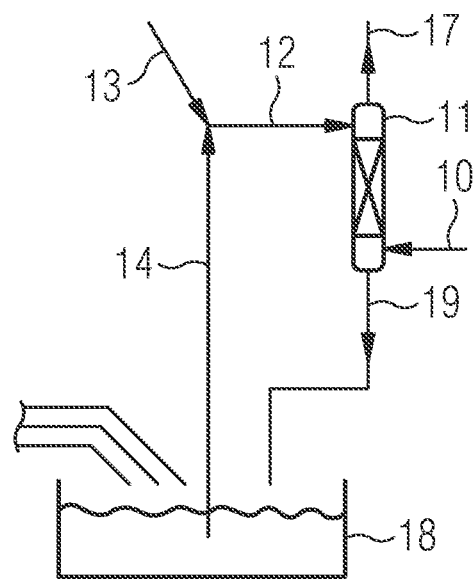

FIG. 5 separately shows the detail that the saturator wastewater conduit 19 has an opening into the water tank 18. Some of the hot water will thus be saturator wastewater.

Figure 6:
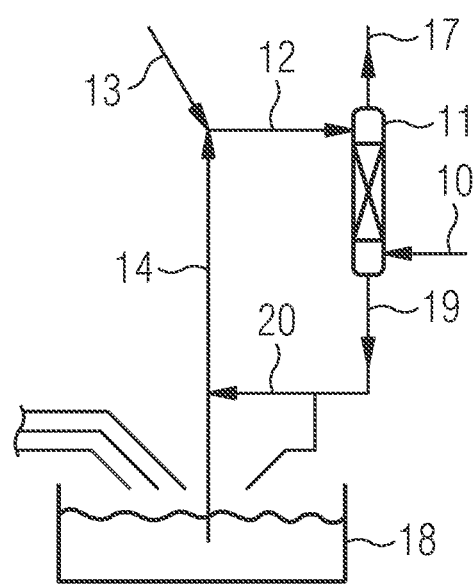

FIG. 6 shows an embodiment in which the variants of FIGS. 4 and 5 are combined—the saturator wastewater conduit has an opening into the water tank 18, and a recycle conduit 20 branches off from the saturator wastewater conduit 19 and opens into the hot water supply conduit 14.

As shown in schematic form, the branch and the opening of the recycle conduit 20 are only at a small difference in height, in order to reduce the expenditure involved in overcoming pressure differences that occur owing to differences in height.

The representation of any degassers present, with which saturator wastewater is degassed prior to introduction into the water tank, has been dispensed with in FIGS. 5 and 6 for better clarity.

The conduit openings at the left-hand edge of the water tank that are shown in accordance with FIG. 2 are optional in FIGS. 4 to 6; in principle, the water tank could also be filled solely with saturator wastewater.

Figure 7:
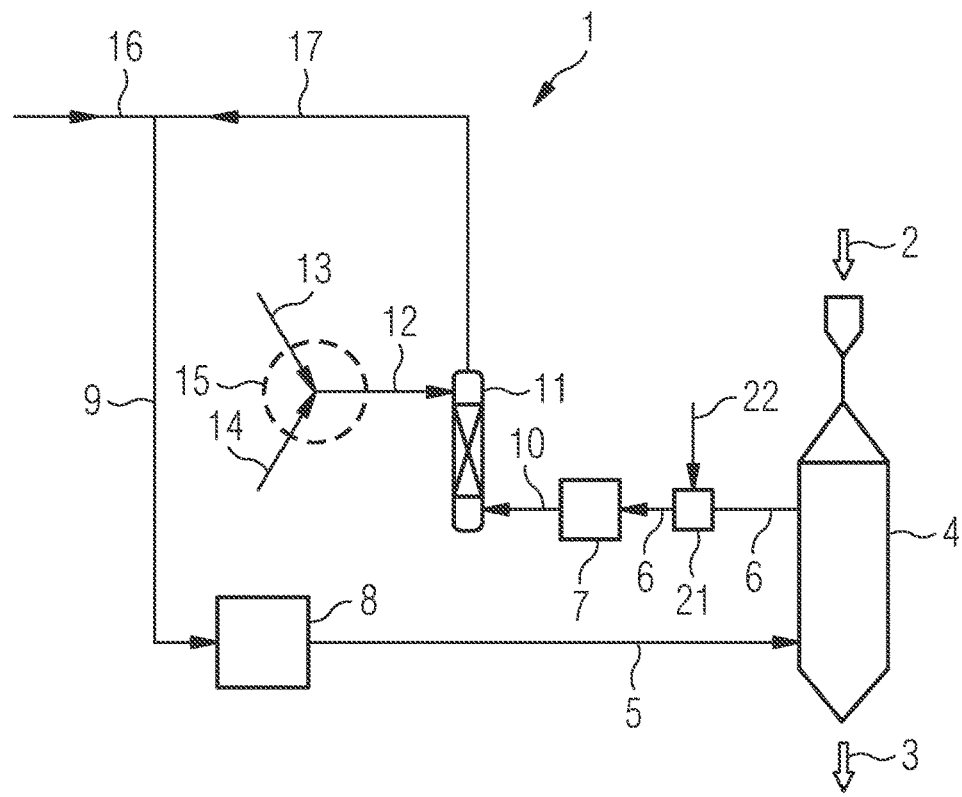
FIGS. 7 to 10 show embodiments in representations largely analogous to FIG. 1.

FIG. 7 shows an embodiment in a representation analogous to FIG. 1, in which desulfurization of the top gas additionally takes place during the dry dedusting. For this purpose, a desulfurization apparatus 21 is present in the top gas removal conduit 6; in the case shown, this desulfurization apparatus serves to introduce a solid adsorbent 22 into the stream of the top gas; it may, for example, be an addition pipe through which the adsorbent 22 is introduced into the top gas removal conduit 6. In the dry dedusting apparatus 7 that follows in flow direction of the top gas, the adsorbent is separated out and adsorbs sulfur or sulfur compounds, for example hydrogen sulfide $H_2S$, from the top gas there.

Figure 8:
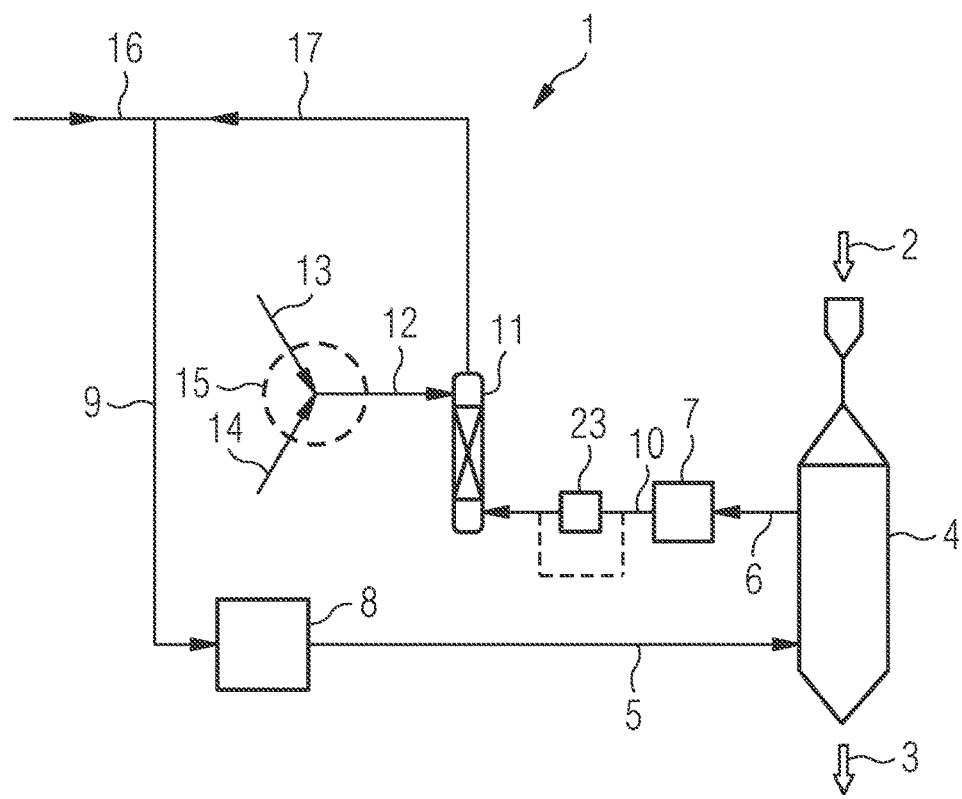

FIG. 8 shows an embodiment in a representation analogous to FIG. 1, in which, in addition, after the dry dedusting, desulfurization of the top gas takes place. For this purpose, a desulfurization apparatus 23 is present in the dedusting conduit 10. An optionally present bypass for operational situations in which at least a proportion of the dry-dedusted top gas is not to pass through the desulfurization apparatus 23 is shown by dotted lines. The desulfurization apparatus 23 acts, for example, on the basis of zinc oxide ZnO; the dry-dedusted top gas flows through a zinc oxide-containing container, and is desulfurized.

Figure 9:
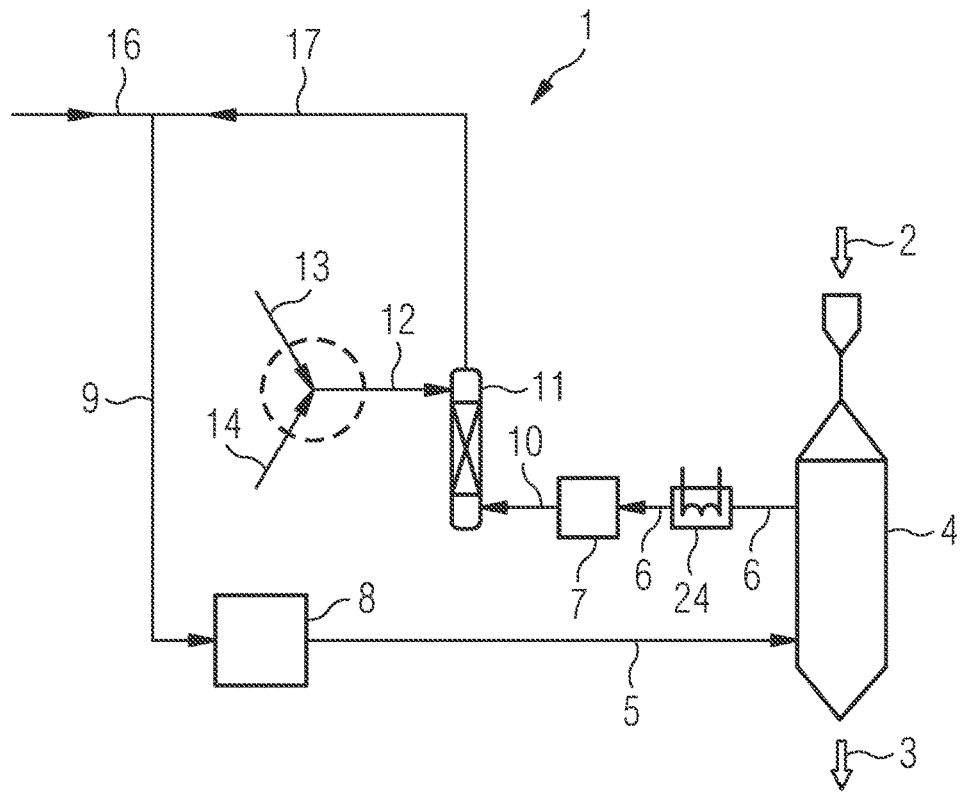

FIG. 9 shows an embodiment in a representation analogous to FIG. 1, in which the temperature of the top gas is reduced prior to the dry dedusting. The temperature of the top gas is reduced prior to the dry dedusting by indirect heat exchange in a heat recovery plant 24—with an indirect heat exchanger in the case shown—in the top gas removal conduit 6. Alternatively, the temperature of the top gas prior to the dry dedusting can be reduced by injection of water or a combination of indirect heat exchange and injection of water. The separate representation of a water injection apparatus instead of or in addition to the heat recovery plant 24 is dispensed with for reasons of clarity.

Alternatively or in combination with injection of water and/or heat exchange, the temperature of the top gas can be lowered prior to the dry dedusting by supplying cooling gas to the stream of the top gas. The separate representation of a cooling gas inlet instead of or in addition to the heat recovery plant 24 and/or water injection apparatus is dispensed with for reasons of clarity.

Figure 10:
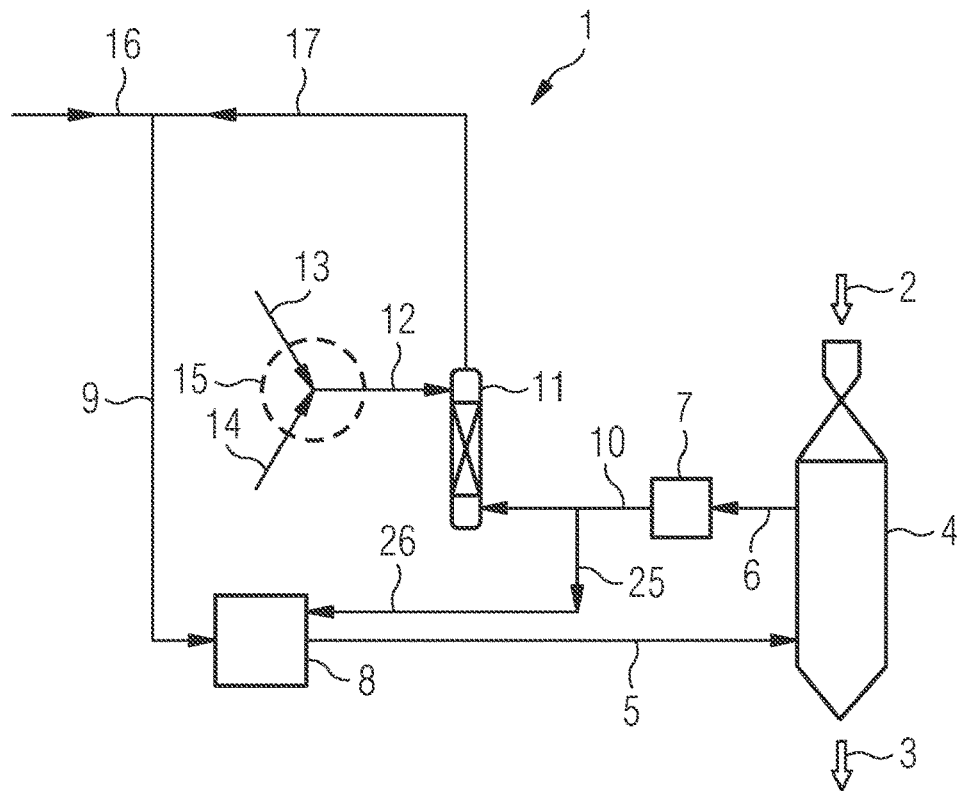

FIG. 10 shows an embodiment in a representation analogous to FIG. 1, in which a proportion of the optionally dry-dedusted top gas—optionally after a desulfurization, not shown for better clarity—is supplied as fuel gas component to the reformer 8 for the catalytic reforming. As known, for example, from MIDREX® processes as in WO2011/012448 and WO2011/012452, the content of which is part of the disclosure of the present application, the energy for reforming is provided by combustion of a fuel gas; the representation of details relating to these known aspects is dispensed with for better clarity. In FIG. 10, a fuel gas component conduit 25 is present, which starts from the dedusting conduit 10 and opens into a fuel gas supply conduit 26 for supply of fuel gas to the reformer 8.

In the fuel gas component conduit 25, or a secondary branch optionally present in the fuel gas component conduit, a gas cooling apparatus may be present; this is not shown for better clarity. The cooled fuel gas component may be combined with uncooled fuel gas components, or sent to the reduction gas for cooling. If hot water is obtained in the cooling, it can be utilized as hot water for the saturator 11.

Figure 11:
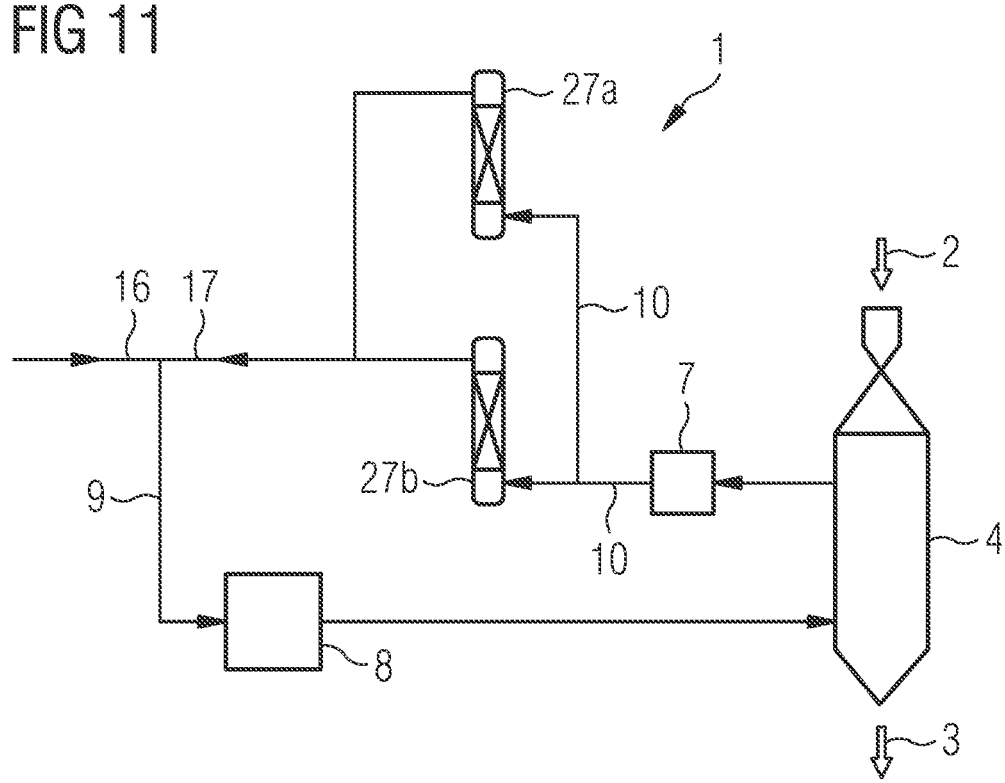
FIGS. 11 to 13 show embodiments with multiple saturators connected in parallel.

FIG. 11 shows an embodiment in a representation analogous to FIG. 1, in which two saturators 27a, 27b are connected in parallel.

Figure 12:
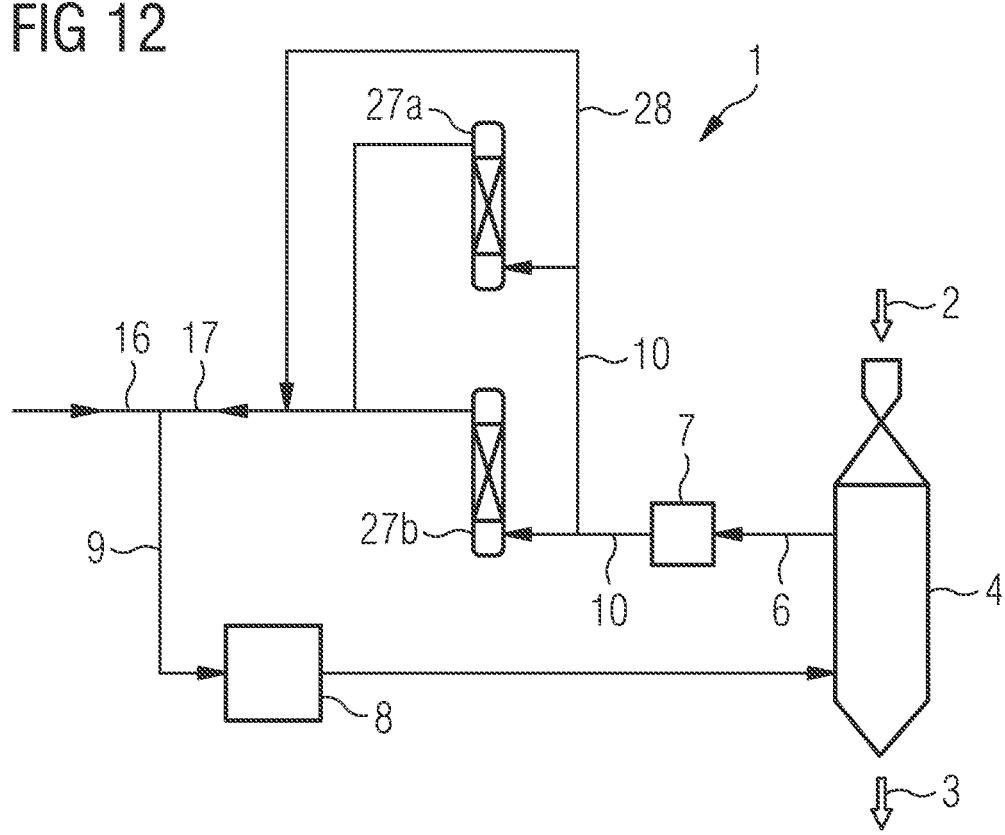

FIG. 12 shows, in a representation largely analogous to FIG. 11, an embodiment in which, unlike in the previous figures, not the entire proportion of the dry-dedusted top gas intended for the preparation of the reduction gas is supplied to a saturator—the two saturators 27a, 27b connected in parallel are also possible—for adjustment of the water vapor content thereof. A portion of the proportion of the dry-dedusted top gas intended for the preparation of the reduction gas is not subjected to any adjustment of the water vapor content in a saturator, but is guided past the saturators 27a, 27b in a bypass 28. The remainder of the proportion is subjected to adjustment of the water vapor content in the saturators 27a, 27b. This is followed by combination of the portion and the remainder of the proportion. The resultant increase in temperature compared to the temperature of the remainder is advantageous for the necessary feeding into downstream compressors.

Figure 13:
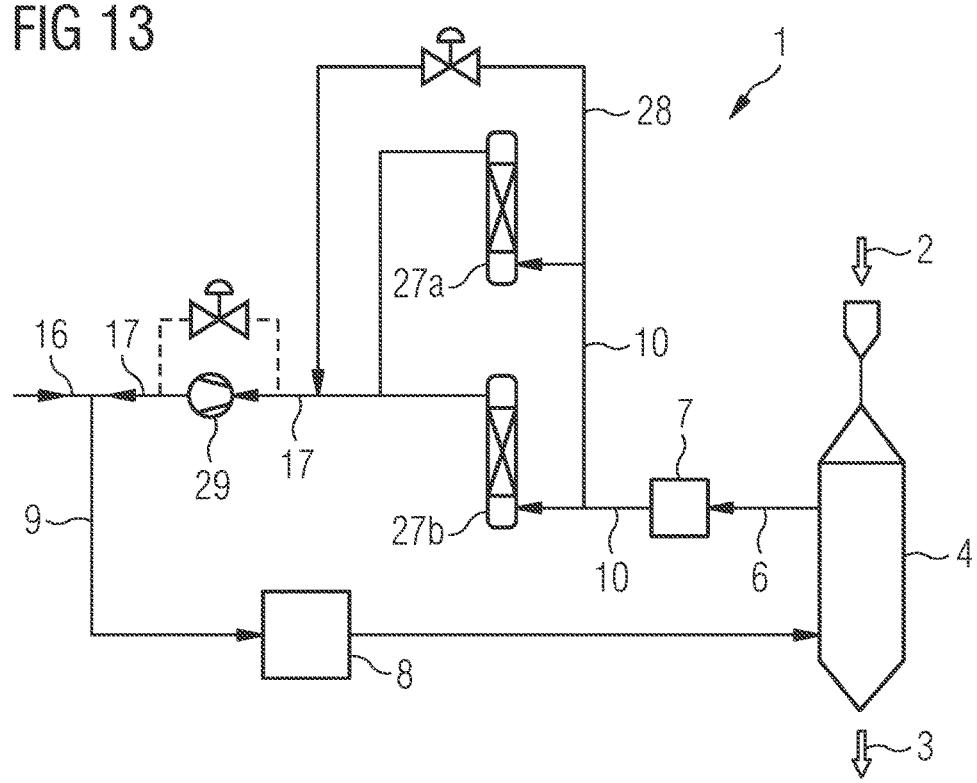

FIG. 13 shows, in a representation largely analogous to FIG. 12, a compressor 29 present in the saturated gas conduit 17. The bypass 28 already discussed in FIG. 12 opens into the saturated gas conduit 17 upstream of the compressor 29. Indicated by dotted lines as optionally present is a recycle conduit for a proportion of dry-dedusted saturated top gas heated by compression into the gas stream sent to the compression for the purpose of increasing the temperature in this gas stream.

Figure 14:
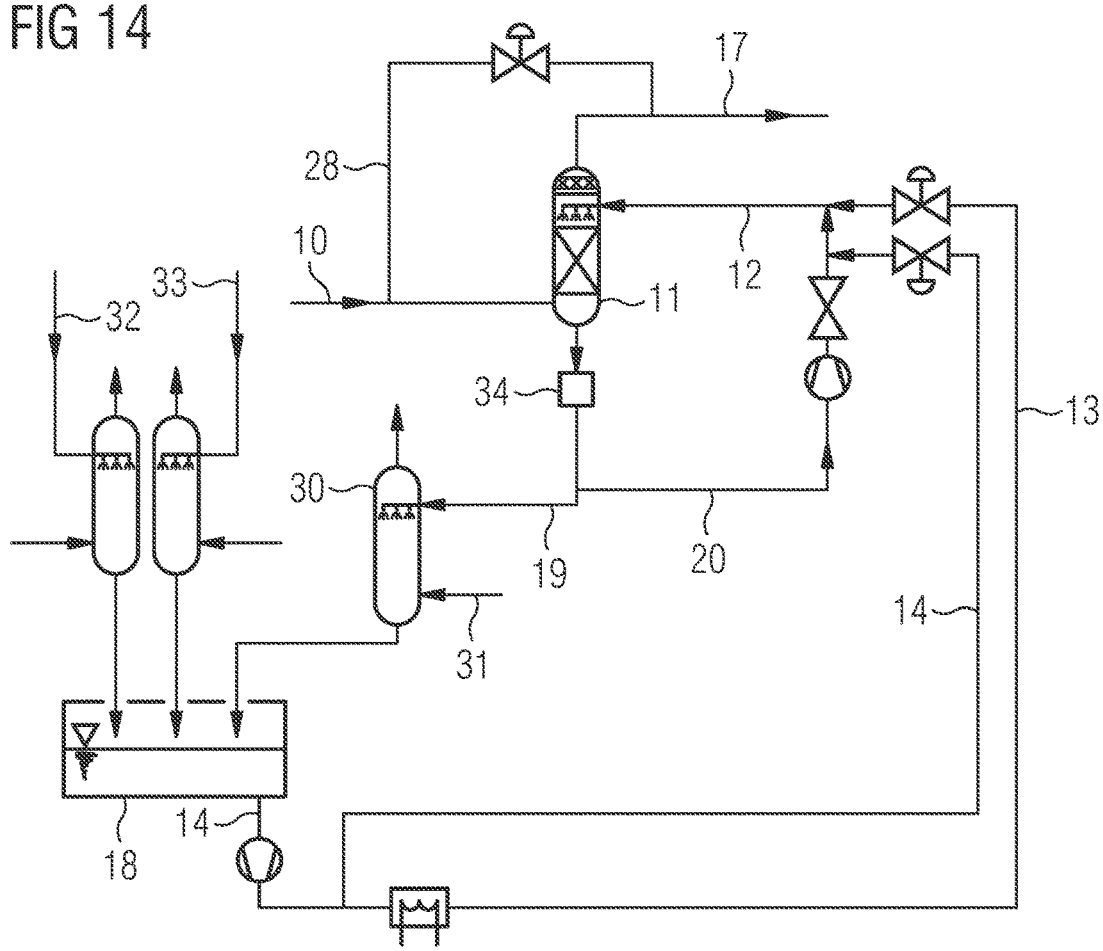
FIG. 14 shows a detail from an apparatus of the invention.

FIG. 14 shows a detail from an apparatus of the invention, wherein reduction aggregate, reformer and dry dedusting are not shown for better clarity. Any reference numbers already being used are used for identical parts of the apparatus. A dry-dedusted top gas is guided through the dedusting conduit 10 to the saturator 11. A bypass 28 starts from the dedusting conduit 10, through which a portion is guided past the saturator. The remainder is introduced into the saturator through the dedusting conduit 10. In principle, it would also be possible for multiple saturators to be present in parallel. In the saturator 10, the packing is shown schematically by a section identified by an X. Likewise shown in schematic form at the upper end of the saturator is a demister by a narrow hatched zone. The saturated top gas is discharged from the saturator 10 via the saturated gas conduit 17. The bypass 28, in which a control valve is also shown, opens into the saturated gas conduit 17. The saturator wastewater conduit 19 removes the saturator wastewater from the saturator 11. An optionally present degasser 30 with accompanying air supply 31 is shown in the saturator wastewater conduit 19. Beyond the degasser, the saturator wastewater conduit opens into a water tank 18, into which degassed saturator wastewater is introduced. Likewise shown as optionally present are a seal gas cooler conduit 32 and a reformed gas cooler conduit 33—for guiding process water out of a cooler for reformed gas, through which hot process water is introduced into the water tank 18, each with a degasser. Also shown in the saturator wastewater conduit 19 is an apparatus part 34 that may be a control valve or a siphon seal. It can also be seen how a recycle conduit 20 starts from the saturator wastewater conduit 19 and opens into the hot water supply conduit 14 beyond a pump. In FIG. 14, the saturator wastewater is supplied with hot water via the hot water supply conduit 14. The hot water supply conduit 14 originates from the water tank 18. The combined amounts are sent to the saturator via the saturation water supply conduit 12 together with cold water from the cold water supply conduit 13.

The cold water supply conduit 13 branches off from the hot water supply conduit 14. This contains a heat exchanger for cooling the hot water; in this way, cold water is produced, which is fed to the saturator 11 together with saturator wastewater and hot water from the hot water supply conduit 13 as saturation water via the saturation water supply conduit 12. In addition, pumps and control valves are shown in the various conduits. The distribution of the saturation water in the saturator 11 is shown in schematic form by suggested distribution nozzles.

Figure 15:
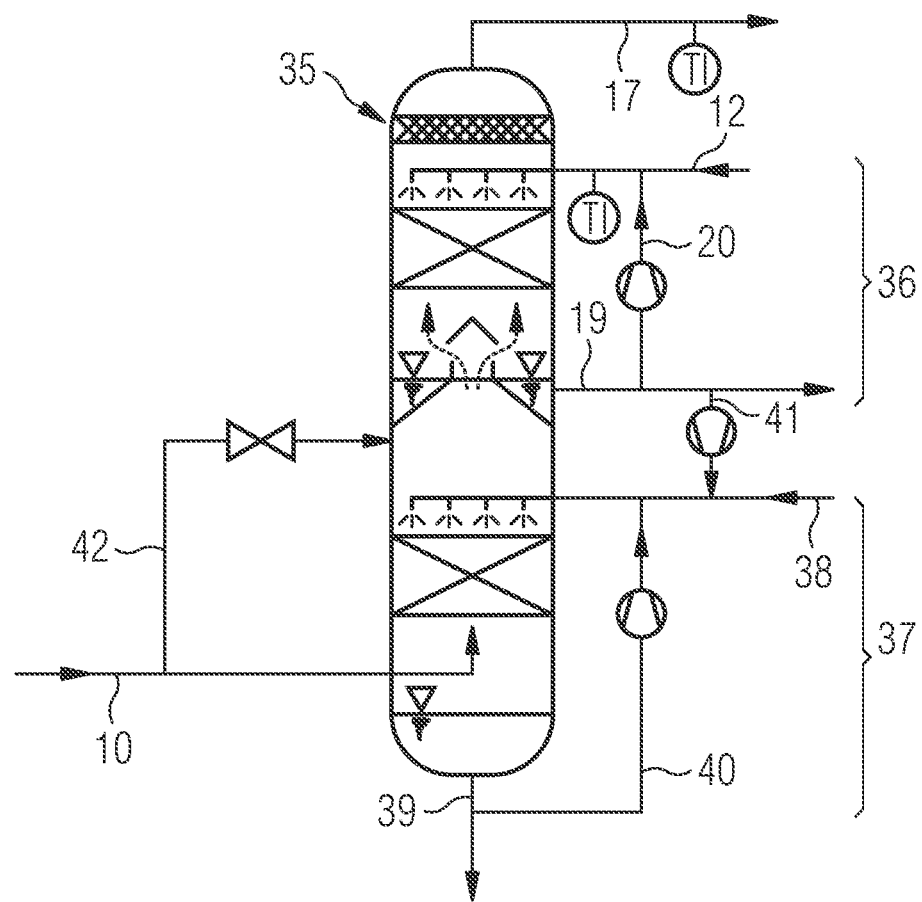
FIG. 15 shows a detail from an apparatus of the invention with a wet desulfurization-saturation aggregate.

FIG. 15 shows a detail from an apparatus of the invention, wherein reduction aggregate, reformer and dry dedusting are not shown for better clarity. Any reference numerals already used are used for identical apparatus parts. Desulfurization takes place after the dry dedusting; dry-dedusted top gas is sent via the dedusting conduit 10 to the wet desulfurization-saturation aggregate 35. In the wet desulfurization-saturation aggregate 35, a saturator 36 is present in the upper portion, and a wet desulfurization aggregate 37 in the lower portion. Gas entering the saturator 36 from the wet desulfurization aggregate 37 is shown by dotted arrows. The wet desulfurization aggregate 37 has a supply conduit 38, removal conduit 39, and recycling conduit 40 including pump for supply of fresh, removal of spent, and recycling of spent desulfurization liquid. The saturator has saturation water supply conduit 12, saturator wastewater conduit 19, and recycle conduit 20. Saturator wastewater can be fed via a feed conduit 41 into the supply conduit 38 for desulfurization liquid.

An optionally present bypass conduit 42 starting from the dedusting conduit 10 opens into the wet desulfurization-saturation aggregate 35 at the saturator end of the wet desulfurization aggregate 37. In addition, the amount of dry-dedusted top gas supplied both to the wet desulfurization aggregate 37 and to the saturator 36 may be controlled; it may be the case that only saturation but no desulfurization is needed for the reformer. At the top, a desulfurized saturated top gas is discharged via the saturated gas conduit 17 from the wet desulfurization-saturation aggregate 35.

If they are not needed for the understanding of the detail being respectively discussed, representation of elements may have been dispensed with in the figures for better clarity, for example the representation of saturation water supply conduit, cold water supply conduit, hot water supply conduit.

Individual or multiple embodiments among those shown in the figures may also be combined.

Even though the invention has been illustrated in detail and described by the preferred working examples, the invention is not restricted by the examples disclosed, and other variations may be inferred therefrom by the person skilled in the art without leaving the scope of protection of the invention.

LIST OF REFERENCE NUMERALS 1 apparatus for reduction of metal oxides
2 metal oxides
3 metallized material
4 reduction aggregate
5 reduction gas supply conduit
6 top gas removal conduit
7 dry dedusting apparatus
8 reformer
9 crude gas supply conduit
10 dedusting conduit
11 saturator
12 saturation water supply conduit
13 cold water supply conduit
14 hot water supply conduit
15 adjustment apparatus
16 hydrocarbon supply conduit
17 saturated gas conduit
18 water tank
19 saturator wastewater conduit
20 recycle conduit
21 desulfurization apparatus
22 adsorbent
23 desulfurization apparatus
24 heat recovery plant
25 fuel gas component conduit
26 fuel gas supply conduit
27a, 27b saturator
28 bypass
29 compressor
30 degasser
31 air supply
32 seal gas cooler conduit
33 reformed gas cooler conduit
34 apparatus part
35 wet desulfurization-saturation aggregate
36 saturator
37 wet desulfurization aggregate
38 supply conduit
39 removal conduit
40 recycling conduit
41 feed conduit
42 bypass conduit

The invention claimed is:

1. A process for reducing metal oxides to metallized material by contact with hot reduction gas, thereby producing a top gas, comprising:
  dry dedusting the top gas;
  guiding a first portion of the dry-dedusted top gas intended for preparation of a crude gas mixture in a bypass past a saturator;
  adjusting a temperature of saturation water, by mixing cold water with hot water having a higher temperature than the cold water, to a target value;
  adjusting a water vapor content of a second portion of the dry-dedusted top gas intended for preparation of the crude gas mixture in the saturator in countercurrent with the saturation water;
  combining subsequently the first portion of the dry-dedusted top gas and the second portion of the dry-dedusted top gas to form a third portion of the dry-dedusted top gas; and
  catalytic reforming of the crude gas mixture to obtain the reduction gas, the crude gas mixture being formed at least based on gaseous hydrocarbons and at least the third portion of the dry-dedusted top gas;
  wherein a second target value for the water vapor content of the second portion of the dry-dedusted top gas is 10-20% by volume.

2. The process as claimed in claim 1, wherein the gaseous hydrocarbons comprise natural gas.

3. The process as claimed in claim 1, wherein the cold water and the hot water are mixed under closed-loop control based on:
  at least one of a measurement of the temperature of the saturation water and a measurement of a temperature of the second portion of the dry-dedusted top gas; and
  At least one of a third target value set for a temperature of the second portion of the dry-dedusted top gas and the target value set for the temperature of the saturation water.

4. The process as claimed in claim 1, wherein at least some of the hot water is saturator wastewater removed from the saturator.

5. The process as claimed in claim 1, wherein the top gas is desulfurized at least one of during and after the dry dedusting.

6. The process as claimed in claim 1, wherein the dry dedusting is preceded by reducing a temperature of the top gas.

7. The process as claimed in claim 1, wherein a fourth portion of the dry-dedusted top gas is sent to a reformer for catalytic reforming as a fuel gas component.

8. The process as claimed in claim 7, wherein the fourth portion of the dry-dedusted top gas is sent to the reformer after desulfurization.

9. The process as claimed in claim 1, wherein the dry-dedusted top gas has a water vapor content less than 30%.

10. The process as claimed in claim 1, wherein the target value for the temperature of the saturation water is in a range of 323 K to 373 K.

11. The process as claimed in claim 10, wherein the target value for the temperature of the saturation water is in a range of 338 K to 363 K.

12. The process as claimed in claim 10, wherein the adjusting of the water vapor content of the second portion of the dry-dedusted top gas is performed at 1 $bar_g$.

13. The process as claimed in claim 10, wherein the adjusting of the water vapor content of the second portion of the dry-dedusted top gas is performed at 2 $bar_g$.

14. The process as claimed in claim 1, further comprising desulfurizing at least a proportion of the dry-dedusted top gas using zinc oxide.

15. The process as claimed in claim 14, wherein the zinc oxide used in the desulfurizing operation is in a range of 473 K to 723 K.

16. The process as claimed in claim 15, wherein the zinc oxide used in the desulfurizing operation is in a further range of 623 K to 723 K.

17. The process as claimed in claim 14, wherein a temperature of the top gas is reduced prior to dedusting such that a further temperature of the dry dedusted top gas subjected to desulfurization is in a range of 473 K to 533 K.

18. The process as claimed in claim 6, wherein the temperature of the top gas is reduced to a range of 423 K to 533 K prior to the dry dedusting operation.

* * * * *